(12) United States Patent
Chin

(10) Patent No.: US 11,782,206 B2
(45) Date of Patent: Oct. 10, 2023

(54) LIGHT BOX

(71) Applicant: ENERGY FULL ELECTRONICS CO., LTD., New Taipei (TW)

(72) Inventor: Hsu-Shen Chin, New Taipei (TW)

(73) Assignee: ENERGY FULL ELECTRONICS CO., LTD., New Taipei (TW)

( * ) Notice: Subject to any disclaimer, the term of this patent is extended or adjusted under 35 U.S.C. 154(b) by 0 days.

(21) Appl. No.: 17/363,069

(22) Filed: Jun. 30, 2021

(65) Prior Publication Data

US 2022/0390660 A1    Dec. 8, 2022

(30) Foreign Application Priority Data

Jun. 2, 2021    (TW) .................................. 110206401

(51) Int. Cl.
*F21V 8/00*    (2006.01)

(52) U.S. Cl.
CPC ........... *G02B 6/009* (2013.01); *G02B 6/0066* (2013.01); *G02B 6/0083* (2013.01)

(58) Field of Classification Search
CPC ............. G02B 6/0021; G02F 1/133314; G02F 1/133308; G02F 1/133317
See application file for complete search history.

(56) References Cited

U.S. PATENT DOCUMENTS

| | | | |
|---|---|---|---|
| 9,074,748 B2* | 7/2015 | Yang ..................... | G02B 6/0023 |
| 9,322,978 B2* | 4/2016 | Lin ....................... | G02B 6/0046 |
| 9,332,978 B2* | 5/2016 | Otley .................... | A61B 18/00 |
| 2010/0219758 A1* | 9/2010 | Melzner ................ | H05K 1/141 |
| | | | 315/113 |

* cited by examiner

*Primary Examiner* — William J Carter
(74) *Attorney, Agent, or Firm* — Mark M. Friedman

(57) ABSTRACT

A light box includes a first case, a second case, and a light emitting module. The first case includes an upper cover and a plurality of sidewalls, a first sidewall of the plurality of sidewalls has a horizontal light guiding slot. The second case includes a bottom plate. The upper cover, the bottom plate and the plurality of sidewalls form a storage space. The light emitting module is placed in parallel to the bottom plate in the storage space.

14 Claims, 11 Drawing Sheets

LIGHT BOX

FIELD OF THE DISCLOSURE

The present disclosure relates to a light box structure, and more particularly, to a light box of a cable connector.

BACKGROUND

In the conventional commercial light box or sign indication light box, fluorescent lamp tube is used to place inside the light box to direct eliminate the light box. Or, the fluorescent lamp tube is used with the light guiding plate to eliminate the light box. In recent years, as the development of the light emitting diode (LED) technology, the LED has the advantages of low power consumption and better environment protection. Therefore, using LED modules to implement the light box could have lower usage cost and maintenance cost than those of the fluorescent lamp tube light box.

PCIE (Peripheral Component Interconnect Express) is a commonly-used interface for computer extended card. The appearance of the conventional PCIE transmission line is not attractive and thus needs to be improved. Therefore, this industry needs to have a light box with a PCIE transmission line, which is cost effective and aesthetically pleasing.

From the above, one of the purpose of the present disclosure is to provide a light box that could cooperate with PCIE transmission line to meet the above demands.

SUMMARY

One objective of an embodiment of the present disclosure is to provide a light box that could cooperate with PCIE transmission line to improve the insufficiency of the conventional art.

According to an embodiment of the present disclosure, a light box is disclosed. The light box comprises: a first case, comprising an upper cover and a plurality of sidewalls, a first sidewall of the plurality of sidewalls has a horizontal light guiding slot; a second case, comprising a bottom plate, wherein the upper cover, the bottom plate and the plurality of sidewalls form a storage space; and a light emitting module, placed in parallel to the bottom plate in the storage space.

Optionally, the light emitting module includes a printed circuit board, at least one light emitting element, and a cable connector part. The least one light emitting element is placed on the printed circuit board and adjacent to the first sidewall. The cable connector part is placed on the printed circuit board and adjacent to a second sidewall opposite to the first sidewall, a third sidewall or a fourth sidewall, configured to connect to a power line or a signal line.

Optionally, the cable connector part is a connector, and the second sidewall, the third sidewall, or the fourth sidewall has an opening.

Optionally, a width of the horizontal light guiding slot is not consistent from its left to its right.

Optionally, the light box further includes a light guiding element, placed in parallel to the first sidewall in the storage space. The light guiding element is configured to guide a light generated from the light emitting module to be outputted from the horizontal light guiding slot.

Optionally, the light guiding element comprises a first transparent surface and a second transparent surface. The first transparent surface is parallel to the first sidewall. The second transparent surface and the first transparent surface form an L-like shape having an included angle.

Optionally, the light box further includes a light guiding mask placed on the first transparent surface. The light guiding mask has a hollow region which forms a pattern.

Optionally, a third sidewall of the plurality of sidewalls and a fourth sidewall of the plurality of sidewalls respectively have a groove, configured to allow the light box to be fixed on an object through a copper pillar. The third sidewall is opposite to the fourth sidewall.

Optionally, the bottom plate comprises a positioning element, the light emitting module comprises a positioning hole, and the positioning element passes through the positioning hole to fix the light emitting module.

Optionally, the light guiding element is manufactured with Polymethyl methacrylate (PMMA).

According to an embodiment of the present disclosure, a light box is disclosed. The light box comprises: a first case, comprising an upper cover and a plurality of sidewalls; a second case, comprising a bottom plate, wherein the upper cover, the bottom plate and the plurality of sidewalls form a storage space; a horizontal light guiding slot, placed between the first case and the second case; and a light emitting module, placed in parallel to the bottom plate in the storage space; wherein the light emitting module performs a lighting operation through the horizontal light guiding slot.

DETAILED DESCRIPTION

Figure 1:
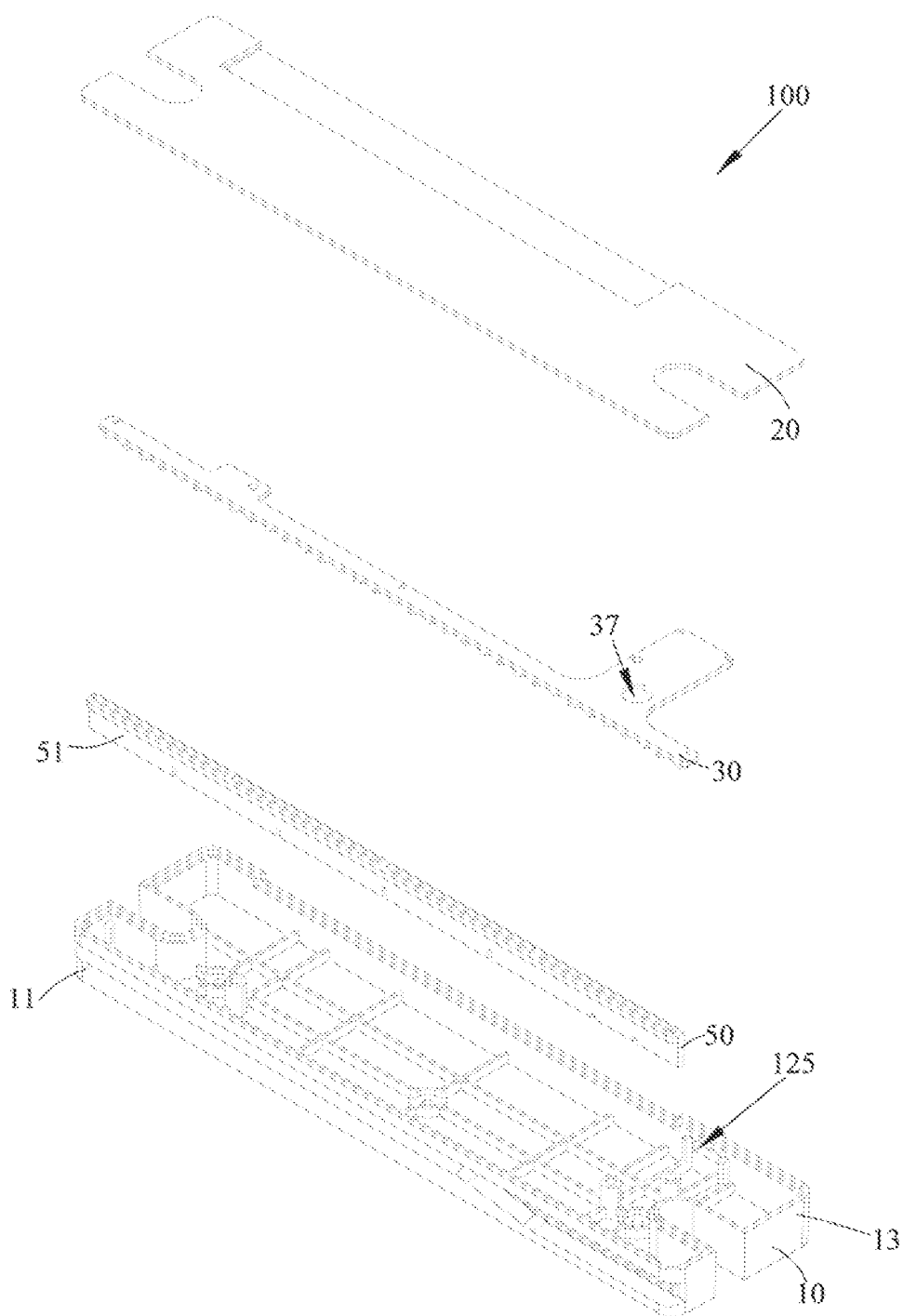
FIG. 1 is an exploded drawing of a light box in a first view angle during a first assembling phase according to an embodiment of the present disclosure.

Embodiments of the present application are illustrated in detail in the accompanying drawings, in which like or similar reference numerals refer to like or similar elements or elements having the same or similar functions throughout the specification. The embodiments described below with reference to the accompanying drawings are exemplary and are intended to be illustrative of the present application, and are not to be construed as limiting the scope of the present application. It is understood that terminologies, such as "center," "longitudinal," "horizontal," "length," "width," "thickness," "upper," "lower," "before," "after," "left," "right," "vertical," "horizontal," "top," "bottom," "inner," "outer," "clockwise," and "counterclockwise," are locations and positions regarding the figures. These terms merely facilitate and simplify descriptions of the embodiments instead of indicating or implying the device or components to be arranged on specified locations, to have specific positional structures and operations. These terms shall not be construed in an ideal or excessively formal meaning unless it is clearly defined in the present specification.

In the description of this specification, the description of the terms "one embodiment", "some embodiments", "examples", "specific examples", or "some examples", and the like, means to refer to the specific feature, structure, material or characteristic described in connection with the embodiments or examples being included in at least one embodiment or example of the present disclosure. In the present specification, the term of the above schematic representation is not necessary for the same embodiment or example. Furthermore, the specific feature, structure, material, or characteristic described may be in combination in a suitable manner in any one or more of the embodiments or examples. In addition, it will be apparent to those skilled in the art that different embodiments or examples described in this specification, as well as features of different embodiments or examples, may be combined without contradictory circumstances.

Moreover, despite one or more implementations relative to the present disclosure being illustrated and described, equivalent alterations and modifications will occur to others skilled in the art upon reading and understanding this specification and the annexed drawings. The present disclosure comprises such modifications and variations, and is to be limited only by the terms of the appended claims. In particular, regarding the various functions performed by the above described components, the terms used to describe such components (i.e. elements, resources, etc.) are intended to correspond (unless otherwise indicated) to any component, which performs the specified function of the described component (i.e., that is, functionally equivalent), even though not structurally equivalent to the disclosed structure which performs the function in the illustrated implementations of the disclosure. In addition, although a particular feature of the disclosure may have been disclosed with respect to only one of several implementations, such a feature may be combined with one or more other features of the other implementations as may be desired and advantageous for any given or particular application. Also, to the extent that the terms "including", "includes", "having", "has", "with", or variants thereof are used in the detailed description or in the claims, such terms are intended to be inclusive in a manner similar to the term "comprising".

Figure 2:
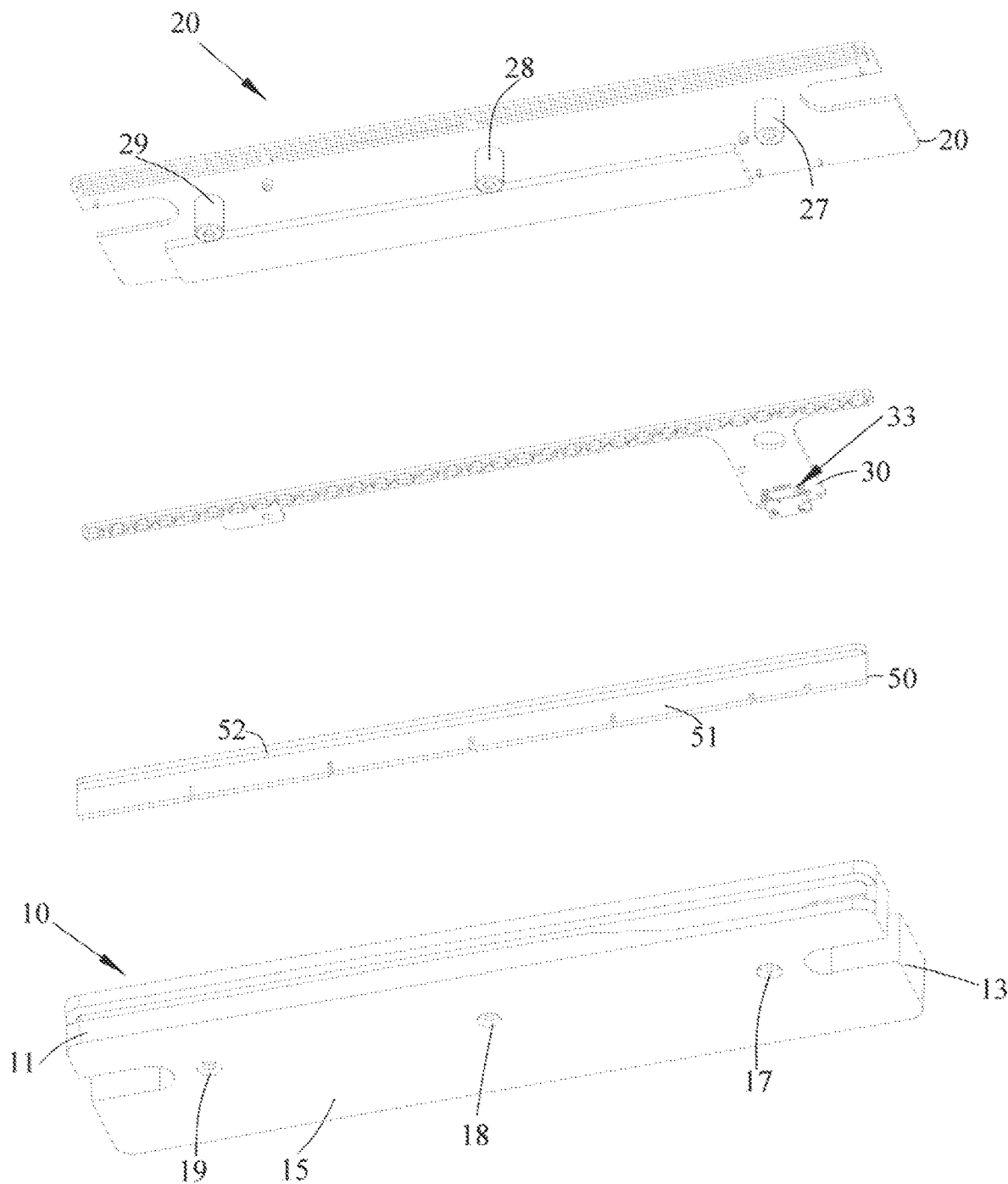
FIG. 2 is an exploded drawing of a light box in a second view angle during a first assembling phase according to an embodiment of the present disclosure.

Please refer to FIG. 1 and FIG. 2. FIG. 1 is an exploded drawing of a light box 100 in a first view angle during a first assembling phase according to an embodiment of the present disclosure. FIG. 2 is an exploded drawing of the light box 100 in a second view angle during a first assembling phase according to an embodiment of the present disclosure. In FIG. 1, FIG. 2 and following figures, the first view angle represents the bottom view of the device and the second view angle represents the top view of the device. The light box 100 comprises, from its top to its bottom, a second case 20, a light emitting module 30, a light guiding element 50, and a first case 10. In this embodiment, the second case 20 comprises positioning elements 27-29. The light emitting module 30 comprises a connection port 35 and a positioning hole 37. The light guiding element 50 comprises a first transparent surface 51 and a second transparent surface 52. The first case 10 comprises positioning holes 17-19.

Figure 3:
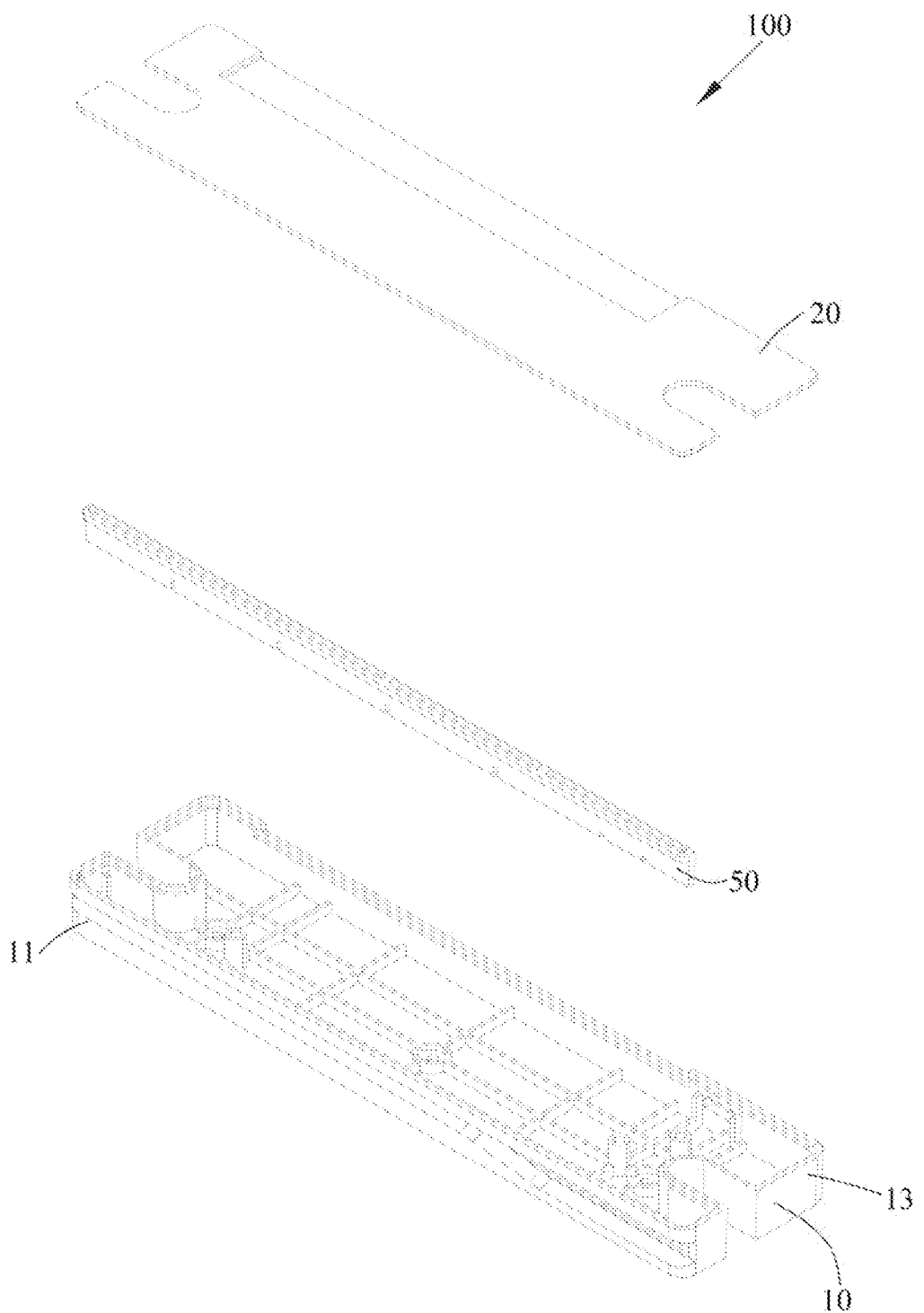
FIG. 3 is an exploded drawing of a light box in a first view angle during a second assembling phase according to an embodiment of the present disclosure.
Figure 4:
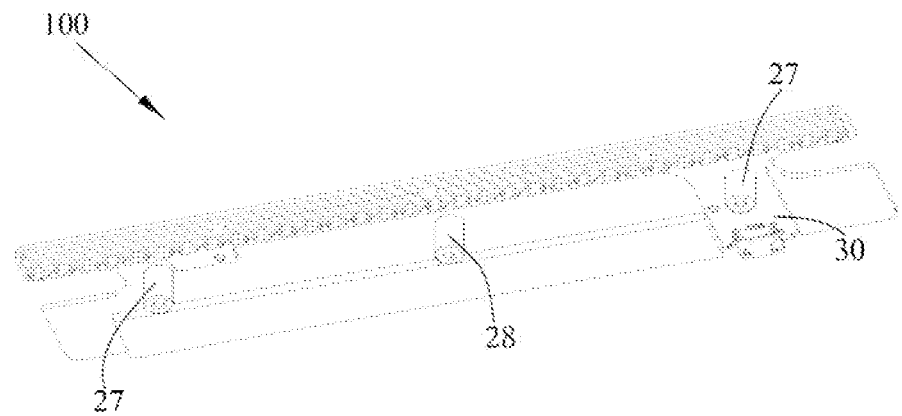
FIG. 4 is an exploded drawing of a light box in a second view angle during a second assembling phase according to an embodiment of the present disclosure.
Figure 4:
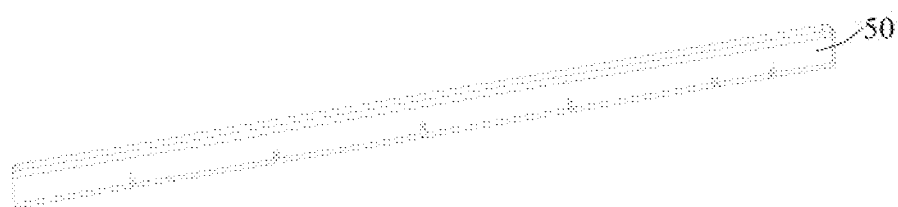
Figure 4:
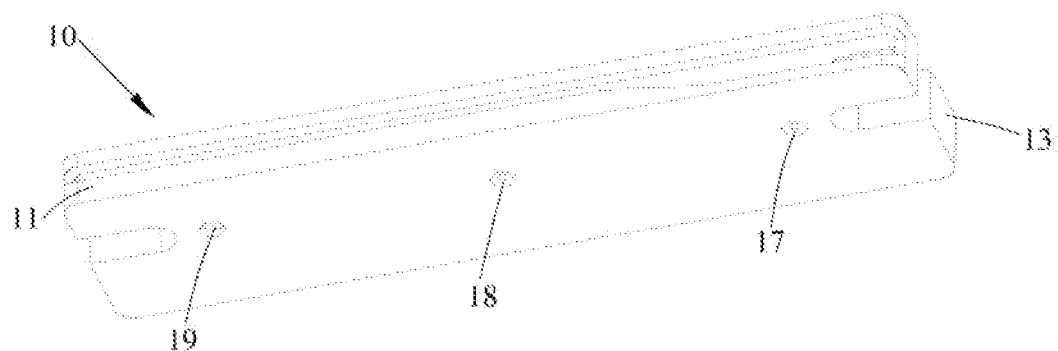

Please refer to FIG. 3 and FIG. 4. FIG. 3 is an exploded drawing of the light box 100 in the first view angle during a second assembling phase according to an embodiment of the present disclosure. FIG. 4 is an exploded drawing of the light box 100 in the second view angle during a second assembling phase according to an embodiment of the present disclosure. FIG. 3 and FIG. 4 show a next assembling phase following FIG. 1 and FIG. 2. In this embodiment, the second case 20 and the light emitting module 30 are assembled together and are fixed through passing the positioning element 27 through the positioning hole 37.

Figure 5:
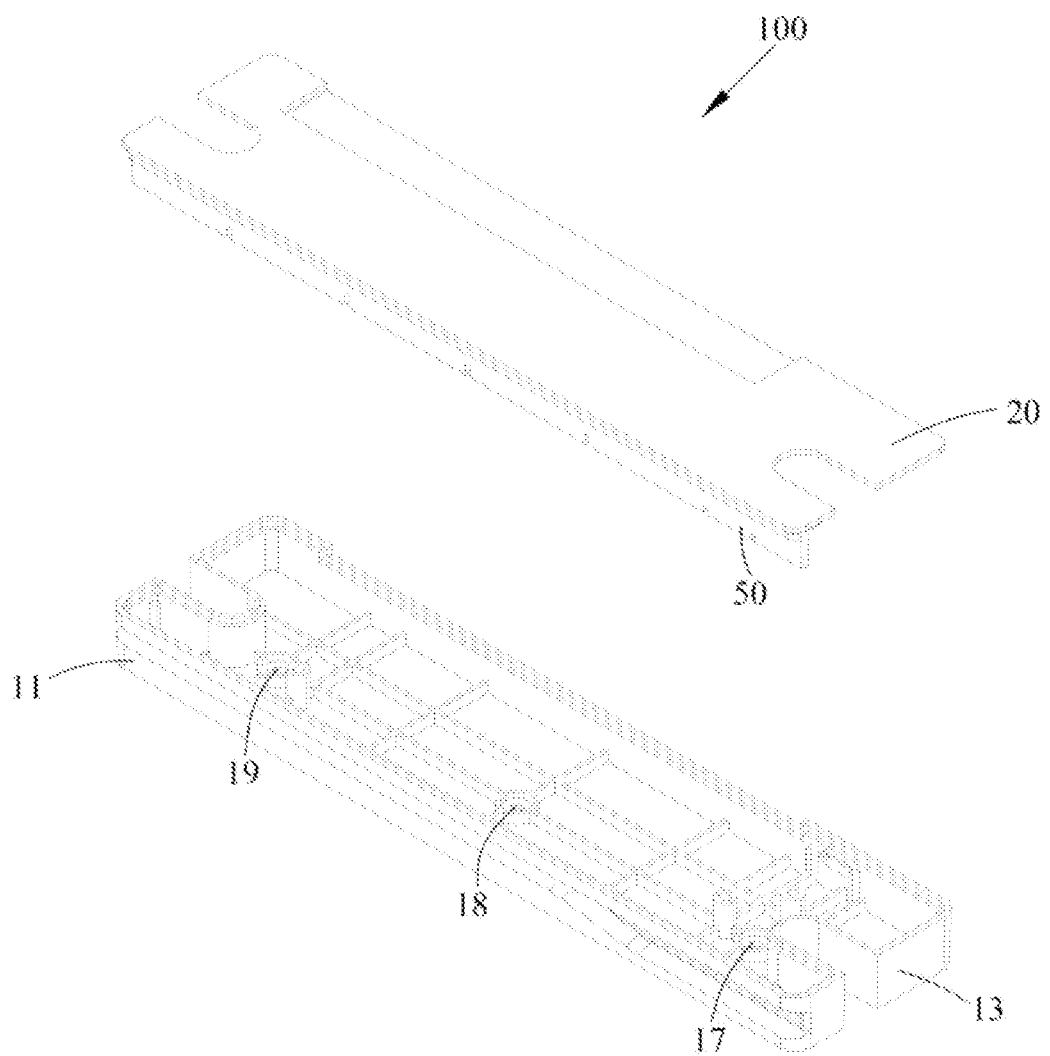
FIG. 5 is an exploded drawing of a light box in a first view angle during a third assembling phase according to an embodiment of the present disclosure.
Figure 6:
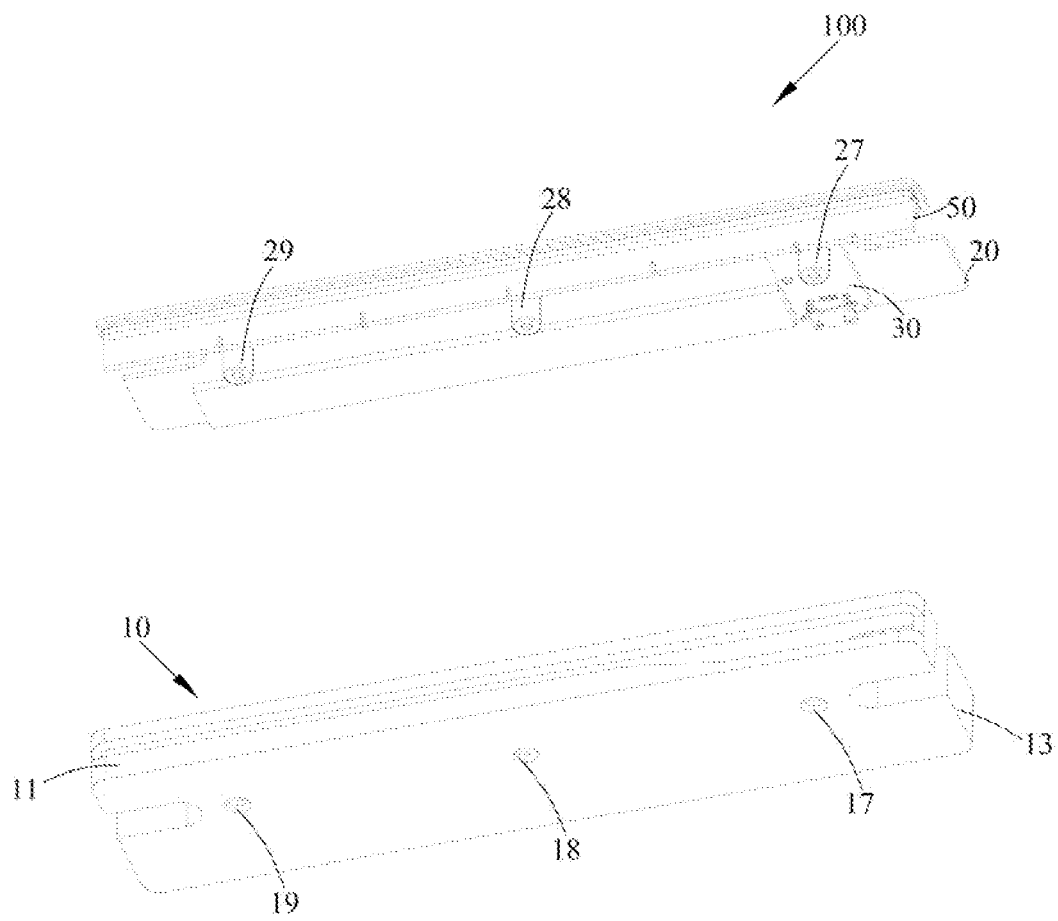
FIG. 6 is an exploded drawing of a light box in a second view angle during a third assembling phase according to an embodiment of the present disclosure.

Please refer to FIG. 5 and FIG. 6. FIG. 5 is an exploded drawing of the light box 100 in the first view angle during a third assembling phase according to an embodiment of the present disclosure. FIG. 6 is an exploded drawing of the light box 100 in the second view angle during a third assembling phase according to an embodiment of the present disclosure. FIG. 5 and FIG. 6 show a next assembling phase following FIG. 3 and FIG. 4. In this embodiment, the second case 20, the light emitting module 30 and the light guiding element 50 are assembled together and the light guiding element 50 is used as a light outputting surface of the light box 100.

Figure 7:
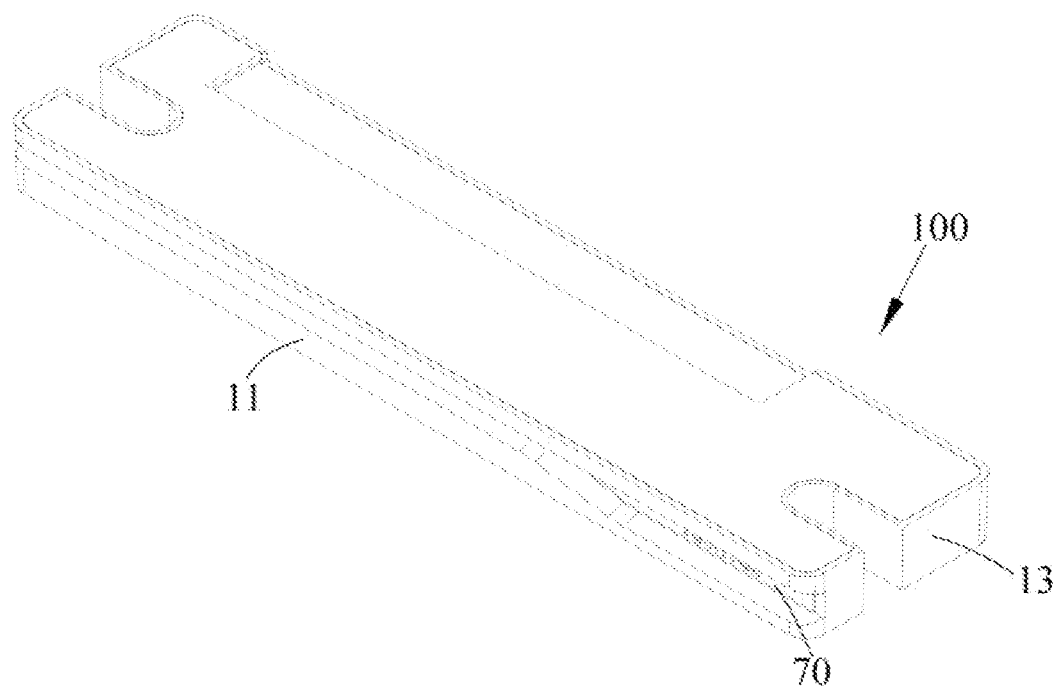
FIG. 7 is a diagram of a completely-assembled light box in a first view angle according to an embodiment of the present disclosure.
Figure 8:
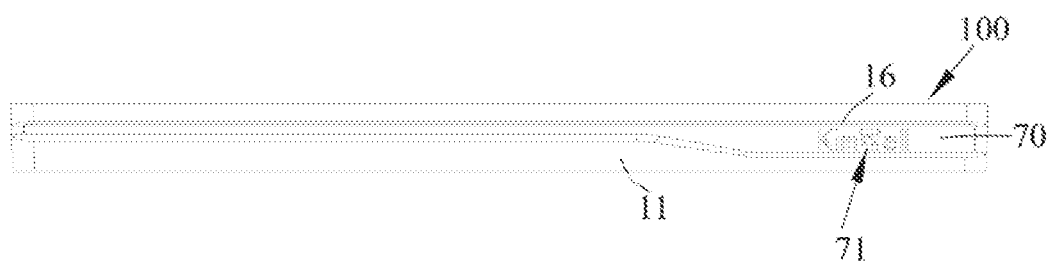
FIG. 8 is a side view of the light box shown in FIG. 7.
Figure 9:
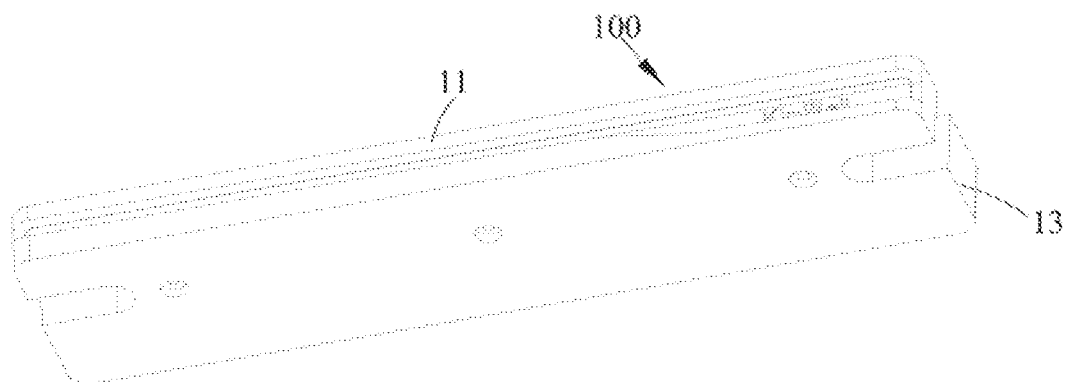
FIG. 9 is a diagram of a completely-assembled light box in a second view angle according to an embodiment of the present disclosure.
Figure 10:
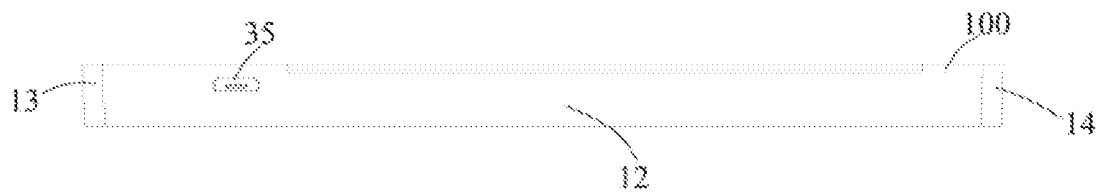
FIG. 10 is a side view of the light box shown in FIG. 7 in another angle
Figure 11:
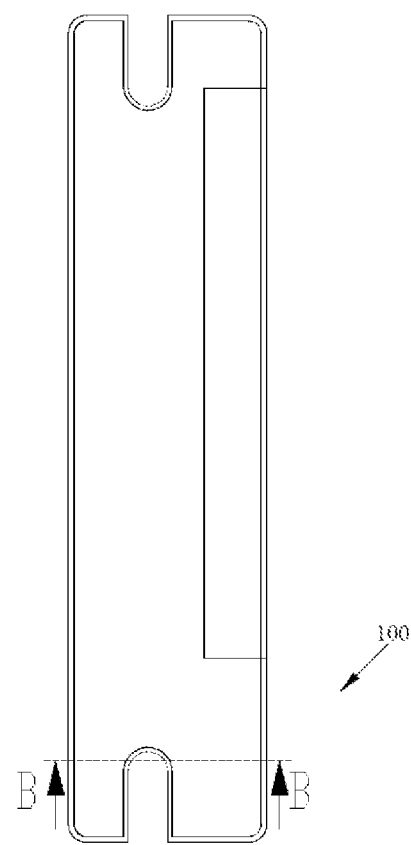
FIG. 11 is a top view of the light box shown in FIG. 7.

Please refer to FIGS. 7-10. FIG. 7 is a diagram of a completely-assembled light box 100 in the first view angle according to an embodiment of the present disclosure. FIG. 8 is a side view of the light box 100 shown in FIG. 7. FIG. 9 is a diagram of the completely-assembled light box 100 in the second view angle according to an embodiment of the present disclosure. FIG. 10 is a side view of the light box 100 shown in FIG. 7 in another angle. In addition, FIG. 11 is a top view of the light box 100 shown in FIG. 7. In this disclosure, most view angles also show the sidewalls 11 and 13. The exact positions of the sidewalls 12 and 14 could be referred to FIG. 10 and FIG. 11. In this embodiment, the second case 20, the light emitting module 30 and the light guiding element 50 are assembled. The horizontal light guiding slot 16 is placed in the light outputting surface of the sidewall 11. Optionally, in some embodiments, the width of the horizontal light guiding slot is not consistent from its left to its right. However, this is not a limitation of the present disclosure. In the actual implementation, the width of the horizontal light guiding slot could be always the same. The light box 100 further comprises a light guiding mask 70 placed on the first transparent surface 51. The light guiding mask 70 has a hollow region 71. The hollow region forms a pattern such as the English word "KimWell" shown in FIG. 8. Through changing the pattern, the light box 100 could have different lighting effects. The present disclosure does not limit the material of light guiding mask 70. It can be transparent or non-transparent. The pattern could have a good identifiability only by having the hollow region 71 in the light guiding mask 70.

Figure 12:
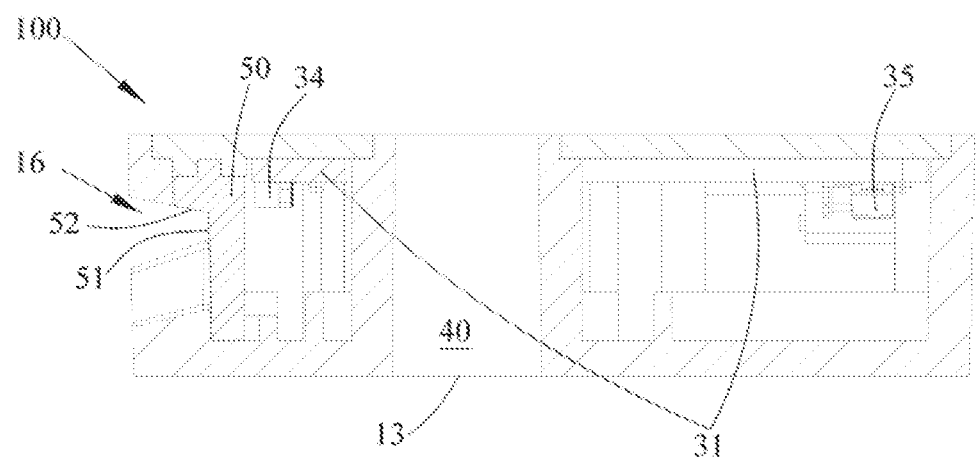
FIG. 12 is a cross-section along B-B line of the light box shown in FIG. 11.

Please refer to FIG. 12. FIG. 12 is a cross-section along B-B line of the light box 100 shown in FIG. 11. As shown in FIG. 12, the light box 100 comprises a first case 10, a second case 20, a light emitting module 30 and a light guiding element 50. The first case 10 comprises an upper cover and a plurality of sidewalls (only the sidewalls 11 and 12 are shown in FIG. 12. The other sidewalls 13 and 15 could be referred to FIG. 2.) The sidewall 11 has a horizontal light guiding slot 16. The second case 20 comprises a bottom plate (please refer to the bottom plate 21 shown in FIG. 2). The upper cover, the bottom plate and the plurality of sidewalls form a complete case having a storage space 40. The light emitting module 30 is placed in parallel to the bottom plate 21 in the storage space 40. The light emitting module 30 the lighting operation through the horizontal light guiding slot 16.

Optionally, the first case 10 and/or the second case 20 could additionally have a magnetic element (not shown) to be fixed on the metal object through the magnetic power. This is not a limitation of the present disclosure. In another embodiment, the first case 10 and/or the second case could be manufactured with magnetic material to have such effects.

The light guiding element 50 could be a light guiding film or a light guiding plate. The light guiding element 50 is used to transform the dot light source of the LED into an area light source by using its high transparency and full reflection characteristics. The area light source has a better light uniformity and thus could save the power consumption. According to different design demands, the thickness could be between 0.1 mm to 10 mm. Optionally, in some embodiments, the light guiding element is manufactured with Polymethyl methacrylate (PMMA) or Polycarbonate (PC) but these are not limitations of the present invention.

The light guiding element 50 is placed in parallel to the sidewall 11 in the storage space and is configured to guide the light generated by the light emitting module to be outputted from the horizontal light guiding slot 16. The light guiding element 50 comprises a first transparent surface 51 and a second transparent surface 52. The first transparent surface 51 is substantially parallel to the sidewall 11. The second transparent surface 52 and the first transparent surface 51 form an L-like shape having an included angle. The second transparent surface 52 is preferably not horizontal (that is, the included angle is slightly larger than 90 degrees) to have a better light guiding effect.

The light emitting module 30 could comprise a printed circuit board 31, a light emitting part 32 and a cable connector part 33. The light emitting part 32 and the cable connector part 33 are placed on the printed circuit board 31. The light emitting matrix 34 is placed on the light emitting part 32 and comprises at least one light emitting element. The light emitting element could be an LED. However, this is not a limitation of the present disclosure. In other words, the light emitting matrix 34 could comprise one or more LEDs.

The light emitting matrix 34 is placed on the printed circuit board 31 and adjacent to the sidewall 11. The cable connector part 33 is placed on the printed circuit board and adjacent to the sidewall 12 opposite to the sidewall 11. The cable connector part 33 is configured to connect to a power line or a signal line.

The cable connector 33 could be a connector, having a connector port 35 for connecting to the power line or the signal line. The sidewall 12 could correspondingly have an opening 125. The light emitting module 30 could further comprises a chargeable battery, which could be charged by the power line or the signal line.

Figure 13:
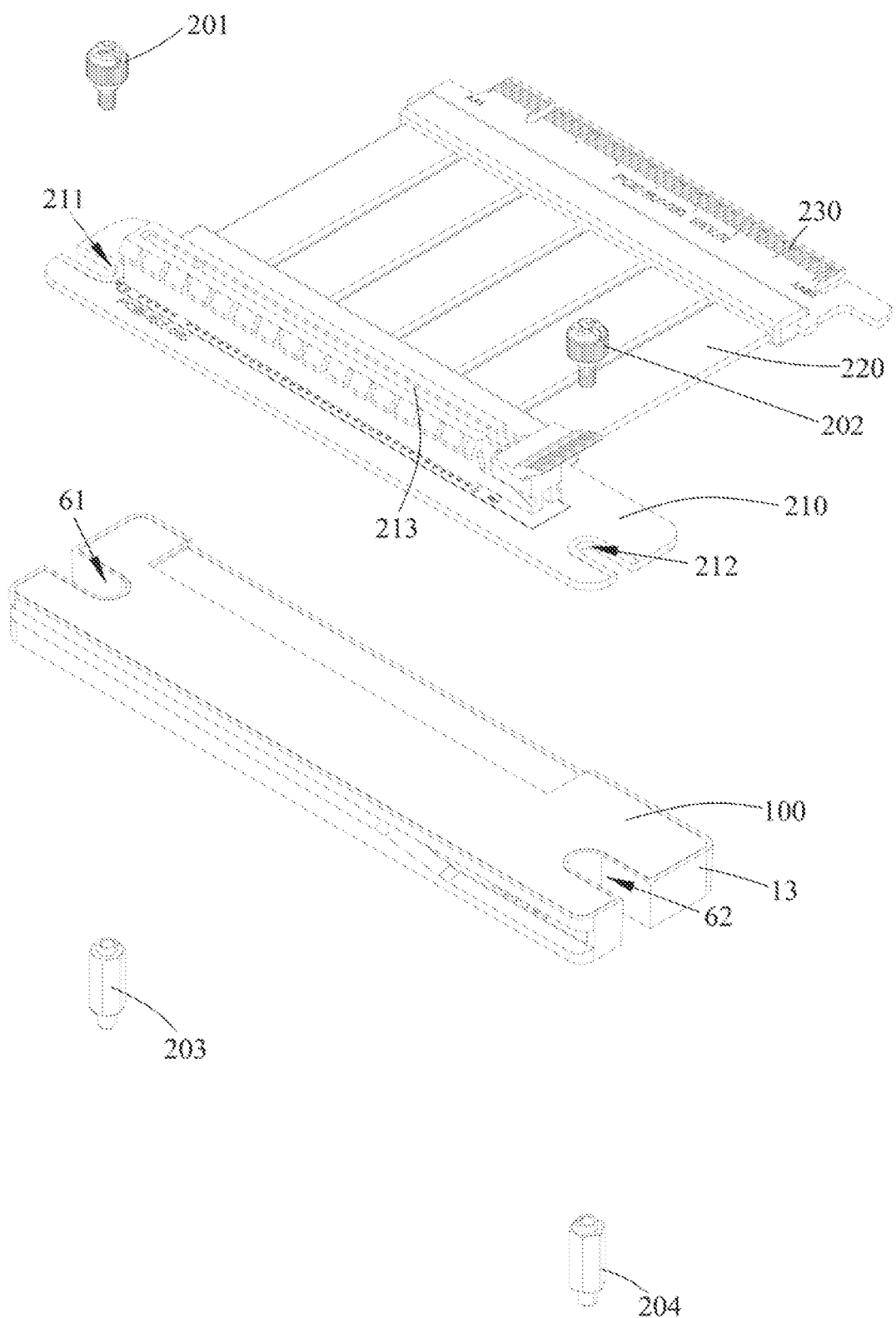
FIG. 13 is a diagram showing the light box shown in FIG. 7 is being assembled with a PCIE adaptor according to an embodiment of the present disclosure.
Figure 14:
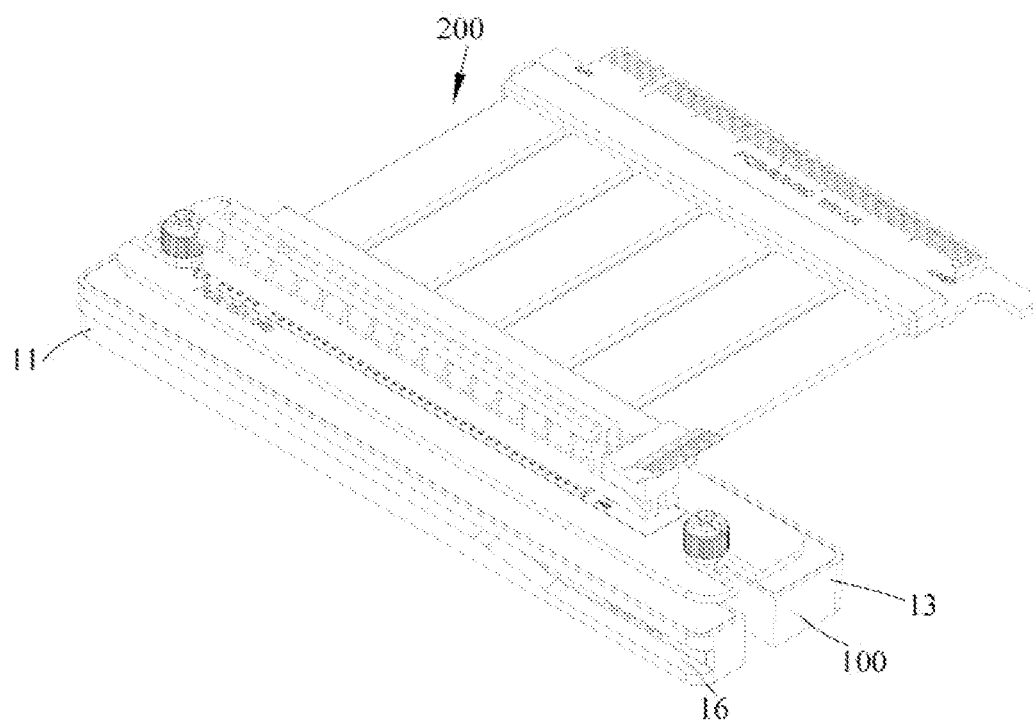
FIG. 14 is a diagram showing the light box shown in FIG. 7 and a PCIE adaptor that are completely assembled according to an embodiment of the present disclosure.
Figure 15:
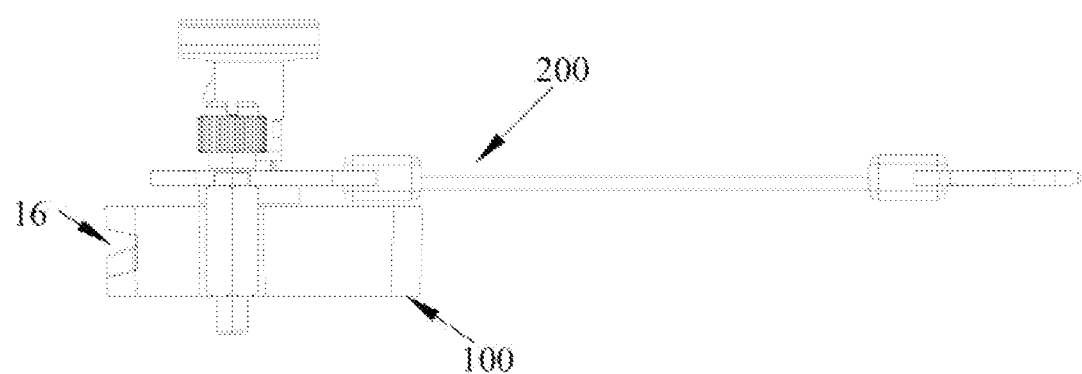
FIG. 15 is a side view of the light box and the PCIE adaptor shown in FIG. 14.

Please refer to FIG. 13. FIG. 13 is a diagram showing the light box 100 shown in FIG. 7 is being assembled with a PCIE adaptor 200 according to an embodiment of the present disclosure. As shown in FIG. 13, the PCIE adaptor 200 comprises a circuit board 210, a signal line 220 and an adapting plate 230. The circuit board 210 comprises grooves 211 and 212 and a socket 213. The grooves 211 and 212 are corresponding to the PCIE adaptor 200. The light box 100 has grooves 61 and 62 such that the light box 100 could be placed underneath the circuit board 210 of the PCIE adaptor 200. For example, the light box 100 and PCIE adaptor 200 could be fixed through screws (such as the screws 201 and 202) and copper pillars (such as the copper pillars 203 and 204). However, this is not a limitation of the present disclosure. FIG. 14 is a diagram showing the light box 100 shown in FIG. 7 and the PCIE adaptor 200 that are completely assembled according to an embodiment of the present disclosure. Here, the sidewall 11 is used as a light outputting surface and the light is outputted through the horizontal light guiding slot 16. FIG. 15 is a side view of the light box 100 and the PCIE adaptor shown in FIG. 14.

From the above, the light box 100 could be well cooperated with the PCIE transmission line. The light box 100 could support the changes of the fonts and colors. The user could acknowledge the working condition variances of the PCIE transmission line through specific signals. Therefore, the light box is practical and have various visual effects.

Above are embodiments of the present invention, which does not limit the scope of the present invention. Any modifications, equivalent replacements or improvements within the spirit and principles of the embodiment described above should be covered by the protected scope of the invention.

What is claimed is:
1. A light box, comprising:
a first case, comprising an upper cover and a plurality of sidewalls, a first sidewall of the plurality of sidewalls has a horizontal light guiding slot;
a second case, comprising a bottom plate, wherein the upper cover, the bottom plate and the plurality of sidewalls form a storage space;
a light emitting module, placed in parallel to the bottom plate and the upper cover in the storage space; and
a light guiding element, placed in parallel to the first sidewall in the storage space, configured to guide a light generated from the light emitting module outwards from the horizontal light guiding slot,
wherein the light guiding element comprises a first transparent surface and a second transparent surface, the first transparent surface is parallel to the first sidewall, the second transparent surface and the first transparent surface form an L-like shape having an included angle slightly larger than 90 degrees,
wherein the second transparent surface and the first transparent surface face the horizontal light guiding slot, and the second surface aligns an inclined surface of the first case facing the horizontal light guiding slot,
wherein the light emitting module comprises:
a printed circuit board;
a plurality of emitting elements, placed on the printed circuit board and adjacent to the first sidewall, wherein an extending direction of a top surface of each of the plurality of emitting elements intersects the second transparent surface;

a cable connector part, placed on the printed circuit board and adjacent to a second sidewall opposite to the first sidewall, a third sidewall or a fourth sidewall, configured to connect to a power line or a signal line.

2. The light box of claim 1, wherein the cable connector part is a connector, and the second sidewall, the third sidewall, or the fourth sidewall has an opening.

3. The light box of claim 1, wherein a width of the horizontal light guiding slot is not consistent from its left to its right.

4. The light box of claim 1, further comprising:
a light guiding mask, placed on the first transparent surface;
wherein the light guiding mask has a hollow region, which forms a pattern.

5. The light box of claim 1, wherein a third sidewall of the plurality of sidewalls and a fourth sidewall of the plurality of sidewalls respectively have a groove, configured to allow the light box to be fixed on an object through a copper pillar; wherein the third sidewall is opposite to the fourth sidewall.

6. The light box of claim 1, wherein the bottom plate comprises a positioning element, the light emitting module comprises a positioning hole, and the positioning element passes through the positioning hole to fix the light emitting module.

7. The light box of claim 1, wherein the light guiding element is manufactured with Polymethyl methacrylate (PMMA).

8. A light box, comprising:
a first case, comprising an upper cover and a plurality of sidewalls;
a second case, comprising a bottom plate, wherein the upper cover, the bottom plate and the plurality of sidewalls form a storage space;
a horizontal light guiding slot, placed between the first case and the second case;
a light emitting module, placed in parallel to the bottom plate and the upper cover in the storage space; and
a light guiding element, placed in parallel to the first sidewall in the storage space, configured to guide a light generated from the light emitting module outwards from the horizontal light guiding slot;
wherein the light emitting module performs a lighting operation through the horizontal light guiding slot,
wherein the light guiding element comprises a first transparent surface and a second transparent surface, the first transparent surface is parallel to the first sidewall, the second transparent surface and the first transparent surface form an L-like shape having an included angle slightly larger than 90 degrees,
wherein the second transparent surface and the first transparent surface face the horizontal light guiding slot, and the second surface aligns an inclined surface of the first case facing the horizontal light guiding slot,
wherein the light emitting module comprises:
a printed circuit board;
a plurality of emitting elements, placed on the printed circuit board and adjacent to the first sidewall, wherein an extending direction of a top surface of each of the plurality of emitting elements intersects the second transparent surface;
a cable connector part, placed on the printed circuit board and adjacent to a second sidewall opposite to the first sidewall, a third sidewall or a fourth sidewall, configured to connect to a power line or a signal line.

9. The light box of claim 8, wherein the cable connector part is a connector, and the second sidewall, the third sidewall, or the fourth sidewall has an opening.

10. The light box of claim 8, wherein a width of the horizontal light guiding slot is not consistent from its left to its right.

11. The light box of claim 8, further comprising:
a light guiding mask, placed on the first transparent surface;
wherein the light guiding mask has a hollow region, which forms a pattern.

12. The light box of claim 8, wherein a third sidewall of the plurality of sidewalls and a fourth sidewall of the plurality of sidewalls respectively have a groove, configured to allow the light box to be fixed on an object through a copper pillar; wherein the third sidewall is opposite to the fourth sidewall.

13. The light box of claim 8, wherein the bottom plate comprises a positioning element, the light emitting module comprises a positioning hole, and the positioning element passes through the positioning hole to fix the light emitting module.

14. The light box of claim 8, wherein the light guiding element is manufactured with Polymethyl methacrylate (PMMA).

* * * * *